US006841915B1

(12) United States Patent
Blume et al.

(10) Patent No.: US 6,841,915 B1
(45) Date of Patent: Jan. 11, 2005

(54) MULTIPLE-POLE ELECTRIC MOTOR AND METHOD OF PRODUCING THE SAME

(75) Inventors: Heinrich-Jochen Blume, Darmstadt (DE); Christian Beckhaus, Darmstadt (DE); Bernd Eberhardt, Dieburg (DE); Karl-Heinz Mittenbuehler, Griesheim (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/868,606

(22) PCT Filed: Dec. 14, 1999

(86) PCT No.: PCT/EP99/09885

§ 371 (c)(1),
(2), (4) Date: Sep. 17, 2001

(87) PCT Pub. No.: WO00/39909

PCT Pub. Date: Jul. 6, 2000

(30) Foreign Application Priority Data

Dec. 23, 1998 (DE) .......................................... 198 60 111

(51) Int. Cl.[7] .......................... H02K 1/14; H02K 21/18; H02K 37/16
(52) U.S. Cl. ........................ 310/254; 29/596; 310/42; 310/216
(58) Field of Search ............................ 310/254, 49 R, 310/42, 216, 218, 40 MM; 29/596; 368/157, 160, 162, 163

(56) References Cited

U.S. PATENT DOCUMENTS 4,703,208 A * 10/1987 Burkhardt et al. ........ 310/49 R
5,825,115 A * 10/1998 Kronenberg et al. ........ 310/254
6,194,797 B1 * 2/2001 Simon et al. .............. 310/49 R
6,262,510 B1 * 7/2001 Lungu ....................... 310/254

FOREIGN PATENT DOCUMENTS

| DE | 2757305 |   | 6/1979 |           |
|----|---------|---|--------|-----------|
| DE | 3630559 | * | 3/1988 | ........... H02K/1/02 |
| DE | 19539138 | * | 4/1997 | ........... H02K/1/14 |
| DE | 19616077 | * | 4/1997 | .......... H02K/21/12 |
| WO | 9011641 |   | 10/1990 |          |
| WO | 90/11641 | * | 10/1990 | .......... H02K/37/04 |

OTHER PUBLICATIONS

Hiroshi, I., JP 55–092556, Jul. 14, 1980 (JPO Abstract).*
Masa, K., JP 55–109169, Aug. 22, 1980 (JPO Abstract).*
Patent Abstracts of Japan, vol. 004, No. 141 (E–028) Oct. 4, 1980 & JP 55092556 A (Rhythm Watch Co. Ltd), Jul. 14, 1980.
Patent Abstracts of Japan, vol. 004, No. 162 (E–033), Nov. 12, 1980 & JP 55 109169 A (Citizen Watch Co LTD), Aug. 22, 1980.

* cited by examiner

*Primary Examiner*—Burton Mullins
(74) *Attorney, Agent, or Firm*—Martin A. Farber

(57) ABSTRACT

The invention relates to a multi-pole electric motor with a rotor and a stator. Said stator consists of a plurality of coils and stator plates (1, 2, 3, 4) which are magnetically separate from one another and which extend from the coils to the rotor. The stator plates (1, 2, 3, 4) are linked with a non-magnetic metal fixture (11) in an area facing the rotor. According to the method of producing the electromotor described above, the stator plates (1, 2, 3, 4) which are interlinked by one or several webs (5) are produced as one workpiece, the workpiece is linked with the non-magnetic steel fixture (11) and the web(s) between or on the stator sheets (1, 2, 3, 4) is/are severed and/or completely removed.

25 Claims, 4 Drawing Sheets

MULTIPLE-POLE ELECTRIC MOTOR AND METHOD OF PRODUCING THE SAME

FIELD AND BACKGROUND OF THE INVENTION

The invention relates to a multipole electric motor with a rotor and a stator, comprising a plurality of coils and stator laminations which are magnetically separated from one another and respectively extend from the coils to the rotor, and to a process for its production.

Multipole electric motors with a plurality of stator laminations and with two or more coils as the stator and with a cylindrical permanent magnet formed as the rotor, which has at least two magnetic poles, are known from practice. In the case of these electric motors, a stator lamination is respectively disposed from each end of the coil to the rotor, where it is situated a very small distance away from the permanent magnet. In the production of the known electric motors, the stator laminations are individually fastened to the ends of the coil and the coils are subsequently fitted in the housing of the electric motor. In the case of these known electric motors, it is disadvantagous that, to produce electric motors with identical electrical and mechanical properties, the positioning of the stator laminations with respect to the rotor is very laborious. If the stator laminations are at the wrong distance from one another or from the rotor, in the worst case the rotor may lock and the electric motor may fail as a consequence.

SUMMARY OF THE INVENTION

The invention therefore has the object of specifying a multipole electric motor in which the stator laminations are positioned particularly precisely with respect to the permanent magnet and which can be produced in a simple manner and the object of specifying a process for its production.

These objects are achieved on the one hand in the case of an electric motor according to the invention by the stator laminations being connected in a region facing the rotor to a holder of non-magnetic metal. This allows them to be positioned easily with respect to one another. It is advantageous in this case that the positioning by the holder is also permanent. In the case of the production process according to the invention, the stator laminations of a motor, connected to one another by one or more webs, are produced as one workpiece and connected to the non-magnetic metallic holder and then the web or webs is or are removed and/or cut through.

By galvanizing the stator lamination, the corrosion resistance of the electric motor is increased. Furthermore, a galvanized lamination can be projection-welded to the non-magnetic holder in such a way that individual zinc atoms and individual atoms of the non-magnetic holder form a common structure and, as a result, the stator laminations are permanently connected to the holder without altering the iron structure of the stator laminations. Projection welding also has the advantage that a stable connection with small dimensions is established.

Finally, projection welding has the advantage that the working step requires only a short time and the workpiece produced by the welding can be further processed immediately.

Of course, adhesive bonding or soldering of the stator laminations to the holder is also possible in principle, but the time required for this is greater than the time required for projection welding.

Brass has been found to have particularly good properties for being worked as the non-magnetic metal, with at the same time adequate stability.

The fact that the stator laminations form a stator which centrally forms an opening for receiving the rotor allows a compact electric motor to be constructed. In this type of configuration, a simply constructed distribution of the magnetic force vectors occurring can be achieved by pairs of opposite stator laminations which are respectively bent in such a way that they can receive a coil.

In its simplest form, such an electric motor has two coils and four stator laminations. An electric motor of this type can be realized in a particularly compact form if two of the opposite stator laminations are in each case cranked once in such a way that one of the coils is arranged between their free ends in such a way that it is magnetically coupled with the stator laminations.

The form of the electric motor described above becomes even more compact if the two other opposite stator laminations have in the vicinity of the opening a first crank and in the vicinity of the free ends a second crank in such a way that the second coil is arranged between their free ends in a manner magnetically coupled with the stator laminations. In particular, a gear mechanism can then be realized in a simple way by a worm drive which can interact with a spur gear being arranged on the shaft of the rotor.

If the holder has a foot for mechanically fixing the stator at the place where the stator is fitted, the stator as a whole can be fastened easily. This fastening becomes particularly easy if the holder can be cranked for fixing, in particular once the foot has been inserted through an opening provided for this a purpose in the housing of the electric motor.

The stator can be positioned easily and reliably in the housing or on a base plate through an opening in a stator lamination into which a positioning pin, for example of a housing, protrudes, in particular in combination with the design of the holder last described.

The stator laminations can be separated particularly easily from the web or the webs if they are cut through by punching and/or are removed completely.

The stator laminations can be positioned particularly easily and precisely on the holder through centering openings in the holder and in the workpiece comprising the stator laminations and the connecting web or the connecting webs.

BRIEF DESCRIPTION OF THE DRAWINGS

The invention is explained in more detail below for a particularly preferred exemplary embodiment on the basis of the figures, in which.

DETAILED DESCRIPTION OF THE PREFERRED EMBODIMENT

Figure 1:
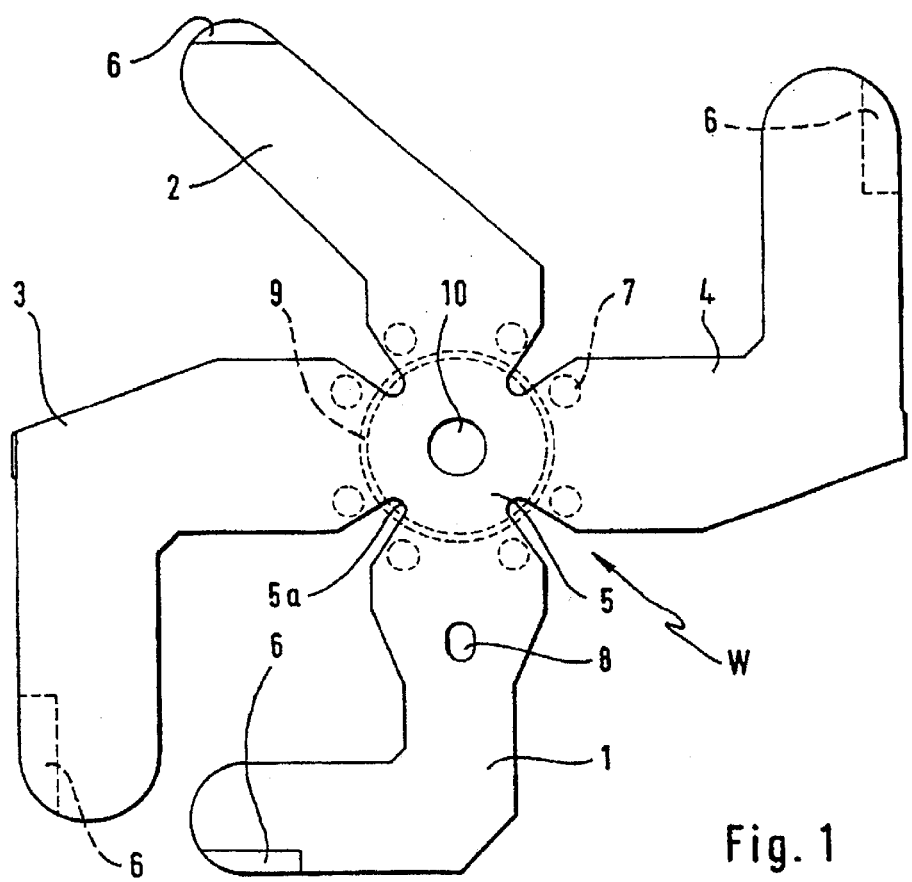
FIG. 1 shows a view of a workpiece comprising four stator laminations which have not yet been cranked and are still connected to one another via a web.

In FIG. 1, a workpiece W has the stator laminations 1, 2, 3, 4 and a web 5, which connects the stator laminations 1, 2, 3, 4 to one another. The workpiece W is, for example, punched out from galvanized steel plate. The stator laminations 1, 2, 3, 4 have in each case a flattened portion 6 for the easy fitting of coils, described later, arranged between pairs of stator laminations 1, 2 and 3, 4, respectively. In the case of each stator lamination 1, 2, 3, 4, the positions of pairs of weld points 7 for connecting to a holder, to be described later, are represented. The stator lamination 1 has an opening 8 in the form of an elongate hole for receiving a positioning pin, which may be arranged for example in a housing.

A double circle 9, drawn in dashed lines, shows the limiting regions between the web 5 and the stator laminations 1, 2, 3, 4. The web 5 also has a round centering opening 10 and four indentations 5a.

Figure 2:
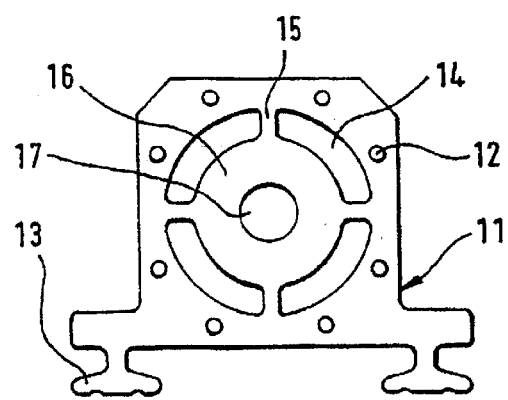
FIG. 2 shows a view of a holder.

In FIG. 2, a holder 11, which is for example punched from brass plate, has eight round boss-shaped projections 12, two feet 13, four radially bent elongate holes 14, four webs 15, which interrupt the elongate holes 14, and a center piece 16 with a centering opening 17.

Figure 3:
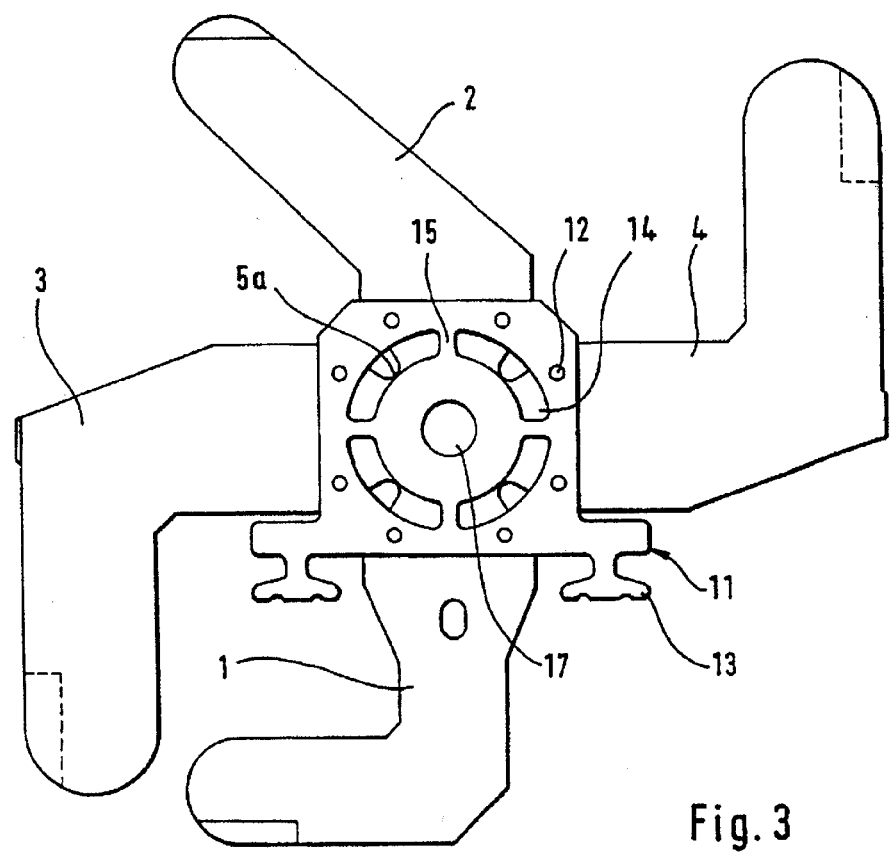
FIG. 3 shows a view of the holder from FIG. 2 connected to the workpiece from FIG. 1.

In FIG. 3, the holder 11 is connected to the workpiece W by eight projection welds, which are located between the boss-shaped projections 12 and the positions of the weld points 7 lying thereunder, not visible in FIG. 3, of the stator laminations 1, 2, 3, 4. Before the welding, the holder 11 and the workpiece W may be centered with one another by a pin, which is passed through the centering opening 17 of the holder 11 and the centering opening 10 lying thereunder of the workpiece W. Depending on the nature of the pin, the diameters of the centering openings 10, 17 have the same dimensions, if the pin is of a cylindrical form, or different dimensions, if the pin is of a tapered form. The centering openings 10, 17 may also be of a polygonal shape.

Figure 4:
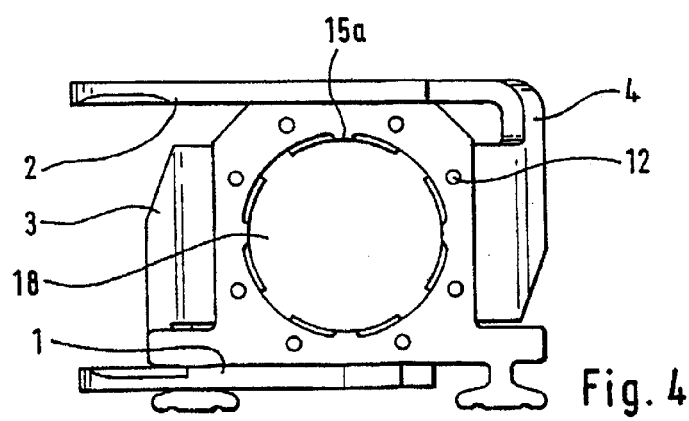
FIG. 4 shows a view of the stator laminations and of the holder from FIG. 3 after their punching and the cranking of the stator laminations.

To obtain the opening 18 represented in FIG. 4 for receiving the rotor, to be described later, the web 5 has been removed from the workpiece W and the center piece 16 with the webs 15 have been removed from the holder 11. The stator laminations 1, 2, 3, 4 are consequently magnetically separated from one another. The removal of the web 5, the center piece 16 and the webs 15 can be advantageously performed by punching out the parts to be removed, it also being possible for the centering opening 17 to serve as a positioning aid for the tool required for the punching. In FIG. 4, web stumps 15a of the otherwise removed webs 15 can still be seen. The fact that, in the case of the holder 11, only the webs 15 have to be cut through and not the entire circumference of the opening 18, means that the holder 11 and the welds on the stator laminations 1, 2, 3, 4 are subjected to less loading by this punching operation and the holder 11 is not deformed. In FIG. 4, the stator laminations 1, 2, 3, 4 have also already been bent into their final position.

Figure 5:
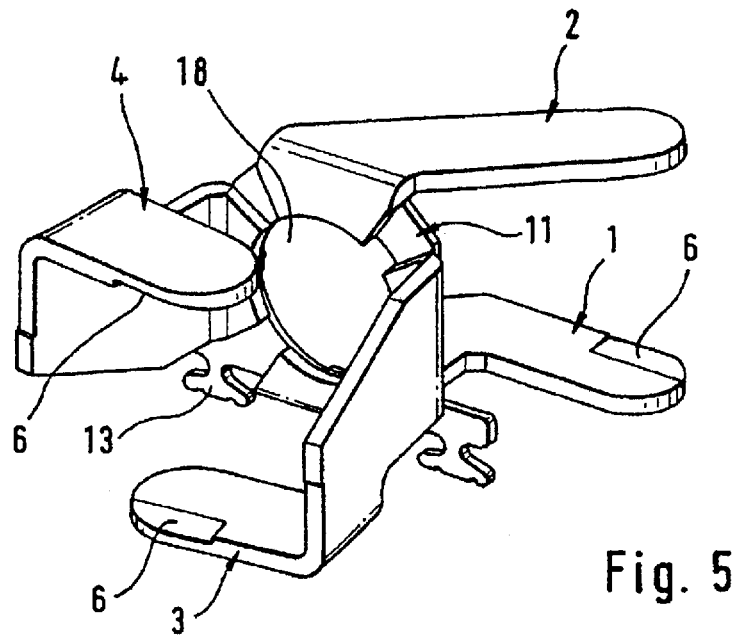
FIG. 5 shows a perspective rear view of the stator laminations and of the holder from FIG. 4.

The perspective view in FIG. 5 shows the rear view of the stator laminations 1, 2, 3, 4 represented in FIG. 4, with the holder 11. It can be seen that the ends of the stator laminations 1, 2, arranged on the holder 11, and of the stator laminations 3, 4 respectively lie opposite one another and that the stator laminations 1, 2 are each cranked once and the stator laminations 3, 4 are each cranked twice in such a way that a coil (not represented) can be arranged in each case between the stator laminations 1, 2 and 3, 4, respectively, with the flattened portions 6 of the ar stator laminations 1, 2, 3, 4 facilitating fitting.

Figure 6:
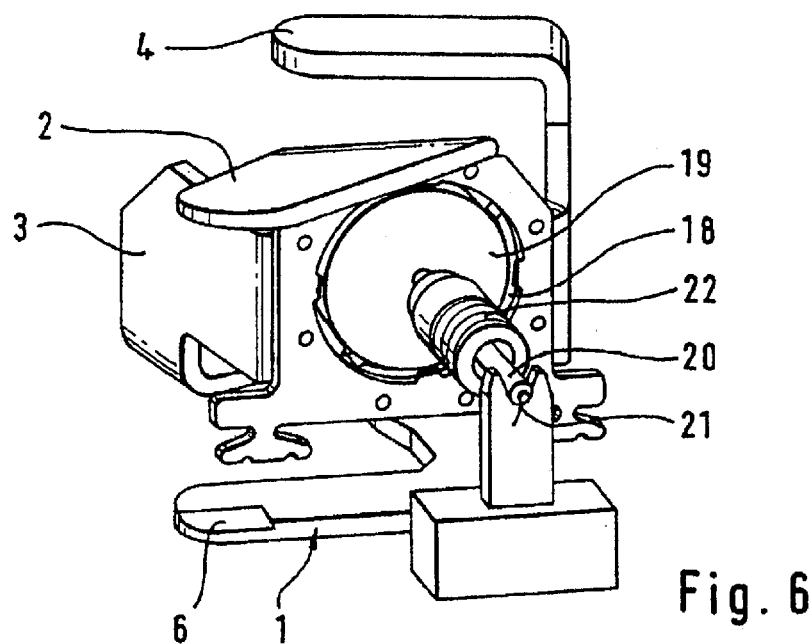
FIG. 6 shows a perspective view of the stator laminations and of the holder from FIG. 4 in interaction with a rotor.

In the case of the perspective view in FIG. 6, in the opening 18 there can be additionally seen a diametrically magnetized rotor 19, which is rotatably mounted by means of a rotor shaft in two bearings, of which the bearing 21 is represented. On the rotor shaft 20, a worm drive 22 is securely connected to the rotor.

Figure 7:
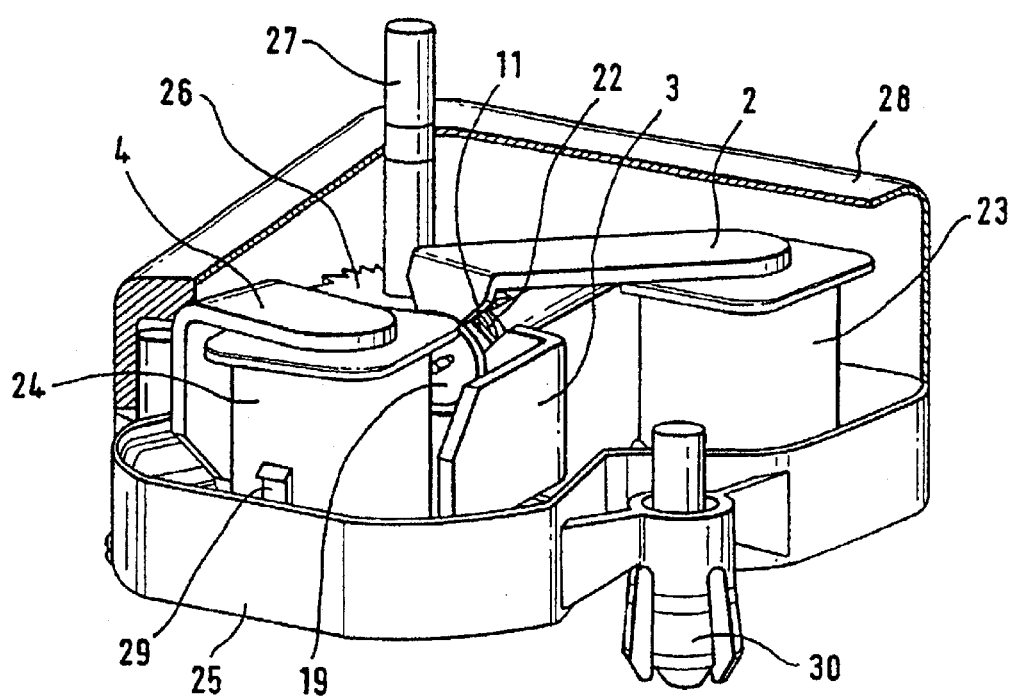
FIG. 7 shows the view and the partial section through an electric motor which has the components from FIG. 6.

In the case of the perspective view with a partial section of an exemplary embodiment of a complete electric motor according to the invention, the position of the view of the stator laminations 1, 2, 3, 4 and of the holder 11 approximately coincides with the position of the view of these parts in FIG. 5. A coil 23 is arranged between the ends of the stator lamination 2 and the stator lamination 1, which cannot be seen, and is magnetically coupled to them. Similarly, a coil 24 is arranged between the ends of the stator laminations 4, 3, the view of the end of the stator lamination 3 being concealed in FIG. 7 by a lower housing part 25. The motor can be operated as a stepping motor, for example by activating the coils 23, 24 with current pulses, or as a synchronous motor, by activating the coils 23, 24 with sinusoidal currents offset by 90°.

The worm drive 22 is in effective connection with a spur gear 26, which is rotatably mounted by means of a shaft 27. A further part of a gear mechanism for example can be fitted onto the shaft 27. It is also possible to fit an indicator onto the shaft 27 and in this way realize a measuring mechanism, in particular when the motor is activated as a stepping motor. The stepping down of the rotary steps of the motor by the gear mechanism comprising the worm drive 22 and the spur gear 26 additionally allows the resolution to be increased. The prescribed motor can be protected against environmental influences by an upper housing part 28, which is advantageously able to be fastened on the lower housing part 25 by means of a clip 29. Finally, the electric motor described above can be fastened easily, quickly and permanently on a printed circuit board, not represented, for example by means of an engaging element 30.

What is claimed is:

1. A multipole electric motor with a rotor and a stator, comprising a plurality of coils, and stator laminations which are magnetically separated from one another and respectively extend from the coils to the rotor, wherein the stator laminations (1, 2, 3, 4) are connected in a region facing the rotor (19) to a holder (11) of non-magnetic metal encircling the rotor, and positioning means, operative with an element extending between the stator and a housing of the motor, for holding the stator in a position within the motor, wherein the element is a foot extending from the holder through an opening in the housing or a pin protruding into an opening in one of the stator laminations.

2. The electric motor as claimed in claim 1, wherein the stator laminations (1, 2, 3, 4) are galvanized.

3. The electric motor as claimed in claim 2, wherein the stator laminations (1, 2, 3, 4) are welded to the holder (11) of the non-magnetic metal.

4. The electric motor as claimed in claim 3, wherein the stator laminations (1, 2, 3, 4) are projection-welded to the holder (11) of the non-magnetic metal.

5. The electric motor as claimed in claim 1, wherein the non-magnetic metal is brass.

6. The electric motor as claimed in 1, wherein the non-magnetic metal is a non-ferrous metal or a non-ferrous metal alloy.

7. The electric motor as claimed in claim 1, wherein the stator laminations (1, 2, 3, 4) form the stator which centrally has an opening (18) for receiving the rotor (19), individual said stator laminations (1, 2, 3, 4) being arranged around the opening (18).

8. The electric motor as claimed in claim 7, wherein pairs of opposite said stator laminations (1, 2, 3, 4) are bent in relation to one another such that they receive a coil (23, 24).

9. The electric motor as claimed in claim 8, wherein it has four stator laminations (1, 2, 3, 4) and two coils (23, 24).

10. The electric motor as claimed in claim 9, wherein two opposite ones of said stator laminations (1, 2) in a first pair of the laminations are bent once in relation to each other such that parts of the stator laminations (1, 2) are aligned parallel to each other, between which parts a first of said two coils (23) is arranged in a magnetically coupled manner.

11. The electric motor as claimed in claim 10, wherein two other opposite stator laminations (3, 4) in a second pair of the laminations have in a vicinity of the opening (18) a first bend and in a vicinity of free ends of the respective limitations a second bend, and wherein a second of said two coils (24) is arranged in a magnetically coupled manner between the free ends, of the second pair of laminations.

12. The electric motor as claimed in claim 11, wherein the coils (23, 24) are arranged axially parallel at one height.

13. The electric motor as claimed in claim 1, wherein the rotor (19) is connected to a worm drive (22) which drives a spur gear (26).

14. A multipole electric motor with a rotor and a stator, comprising a plurality of coils and stator laminations which are magnetically separated from one another and respectively extend from the coils to the rotor, wherein the stator laminations (1, 2, 3, 4) are connected in a region facing the rotor (19) to a holder (11) of non-magnetic metal, and wherein the holder (11) has at least one foot (13) for mechanically fixing the stator at its place in the motor.

15. The electric motor as claimed in claim 14, wherein the foot (13) is bendable after a fitting of the stator for the fixing of the stator at said place.

16. The electric motor as claimed in claim 14, wherein the stator is fixable in a housing.

17. A multipole electric motor with a rotor and a stator, comprising a plurality of coils and stator laminations which are magnetically separated from one another and respectively extend from the coils to the rotor, wherein the stator laminations (1, 2, 3, 4) are connected in a region facing the rotor (19) to a holder (11) of non-magnetic metal, and wherein one stator lamination (1) has an opening (8) into which a positioning pin protrudes.

18. The electric motor as claimed in claim 17, wherein the positioning pin is arranged in a housing.

19. A multipole electric motor with a rotor and a stator, comprising a plurality of coils and stator laminations which are magnetically separated from one another and respectively extend from the coils to the rotor, wherein the stator laminations (1, 2, 3, 4) are connected in a region facing the rotor (19) to a holder (11) of non-magnetic metal, and wherein the stator laminations (1, 2, 3, 4) have at their ends facing the coils (23, 24) flattened portions (6) for facilitating fitting of the coils (23, 24).

20. A process for producing an electric motor with a rotor and a stator, comprising a plurality of coils and stator laminations which are magnetically separated from one another and respectively extend from the coils to the rotor, the stator laminations (1, 2, 3, 4) are connected in a region facing the rotor (19) to a holder (11) of non-magnetic metal, the stator laminations (1, 2, 3, 4) being connected in a region facing the rotor (19) to a holder (11) of non-magnetic metal and are connected to one another by at least one web (5), the process comprising the steps of producing the stator laminations as one workpiece (W), aligning and connecting the workpiece (W) to the holder (11) of the non-magnetic metal, and subsequently separating a central portion of the holder and the at least one web (5) between or on the stator laminations (1, 2, 3, 4) respectively from the holder and the stator laminations.

21. The process as claimed in claim 20, wherein the connection of the stator laminations (1, 2, 3, 4) to the holder (11) takes place by soldering, adhesive bonding and riveting.

22. The process as claimed in claim 20, wherein the stator laminations (1, 2, 3, 4) are welded to the holder (11) of the non-magnetic metal.

23. A process for producing an electric motor with a rotor and a stator, comprising a plurality of coils and stator laminations which are magnetically separated from one another and respectively extend from the coils to the rotor, the stator laminations (1, 2, 3, 4) are connected in a region facing the rotor (19) to a holder (11) of non-magnetic metal, the stator laminations (1, 2, 3, 4) being connected in a region facing the rotor (19) to a holder (11) of non-magnetic metal and are connected to one another by at least one web (5), the process comprising the steps of producing the stator laminations as one workpiece (W), wherein the workpiece (W) is connected to the holder (11) of the non-magnetic metal and the at least one web (5) between or on the stator laminations (1, 2, 3, 4) is cut through or removed completely, wherein the stator laminations (1, 2, 3, 4) are welded to the holder (11) of the non-magnetic metal and are galvanized with a zinc layer, and, wherein the welding is performed as projection welding, boss-shaped projections (12) being formed in the holder (11) and a required welding current being chosen such that atoms of the holder (11) migrate into the zinc layer of the stator laminations (1, 2, 3, 4) without altering the structure of remaining metal of the stator laminations.

24. A process for producing an electric motor with a rotor and a stator, comprising a plurality of coils and stator laminations which are magnetically separated from one another and respectively extend from the coils to the rotor, the stator laminations (1, 2, 3, 4) are connected in a region facing the rotor (19) to a holder (11) of non-magnetic metal, the stator laminations (1, 2, 3, 4) being connected in a region facing the rotor (19) to a holder (12) of non-magnetic metal and are connected to one another by at least one web (5), the process comprising the steps of producing the stator laminations as one workpiece (W), wherein the workpiece (W) is connected to the holder (11) of the non-magnetic metal and the at least one web (5) between or on the stator laminations (1, 2, 3, 4) is cut through or removed completely, and wherein the one or more webs (5) between stator surfaces are removed completely.

25. A process for producing an electric motor with a rotor and a stator, comprising a plurality of coils and stator laminations which are magnetically separated from one another and respectively extend from the coils to the rotor, the stator laminations (1, 2, 3, 4) are connected in a region facing the rotor (19) to a holder (11) of non-magnetic metal, the stator laminations (1, 2, 3, 4) being connected in a region facing the rotor (19) to a holder (11) of nonmagnetic metal and are connected to one another by at least one web (5), the process comprising the steps of producing the stator laminations as one workpiece (W), wherein the workpiece (w) is connected to the holder (11) of the non-magnetic metal and the at least one web (5) between or on the stator laminations (1, 2, 3, 4) is cut through or removed completely, and wherein the workpiece (w) and the holder (11) are positioned with one another by a pin passed through centering openings (10, 17).

* * * * *